United States Patent
Sylos et al.

(10) Patent No.: US 11,263,207 B2
(45) Date of Patent: Mar. 1, 2022

(54) PERFORMING ROOT CAUSE ANALYSIS FOR INFORMATION TECHNOLOGY INCIDENT MANAGEMENT USING COGNITIVE COMPUTING

(71) Applicant: KYNDRYL, INC., New York, NY (US)

(72) Inventors: Marcos De Castro Sylos, Ribeirao Preto (BR); Carlos Alexandre Salgado Penante, Rio de Janeiro (BR); Andre Ricardo Cavalcanti De Araujo, Rio de Janeiro (BR); Fernando De Andrade Cavalcanti, Belo Horizonte (BR)

(73) Assignee: KYNDRYL, INC., New York, NY (US)

(*) Notice: Subject to any disclaimer, the term of this patent is extended or adjusted under 35 U.S.C. 154(b) by 477 days.

(21) Appl. No.: 16/157,622

(22) Filed: Oct. 11, 2018

(65) Prior Publication Data
US 2020/0117734 A1   Apr. 16, 2020

(51) Int. Cl.
*G06F 16/00* (2019.01)
*G06F 16/242* (2019.01)
*G06F 16/2455* (2019.01)
*G06F 40/30* (2020.01)

(52) U.S. Cl.
CPC .... *G06F 16/2425* (2019.01); *G06F 16/24552* (2019.01); *G06F 40/30* (2020.01)

(58) Field of Classification Search
CPC . G06F 16/2425; G06F 40/30; G06F 16/24552
USPC ........................................................ 707/721
See application file for complete search history.

(56) References Cited

U.S. PATENT DOCUMENTS

| 8,713,033 | B1 | 4/2014 | Stoverink et al. |
| 9,317,829 | B2 | 4/2016 | Anand et al. |
| 9,542,259 | B1* | 1/2017 | McEwen ............. G06F 11/0706 |
| 2005/0197992 | A1 | 9/2005 | Kipersztok et al. |

(Continued)

OTHER PUBLICATIONS

Soni et al., "Cognitive Approach to Root Cause Analysis for Improving Quality of life: A case study for IT Industry", International Journal of Informative and Futuristic Research (Online), vol. 1 Issue 1, Aug.-Sep. 2013; 8 pages.

(Continued)

*Primary Examiner* — Thanh-Ha Dang
(74) *Attorney, Agent, or Firm* — Erik Swanson; Andrew M. Calderon; Roberts Calderon Safran & Cole P.C.

(57) ABSTRACT

Methods and systems for performing root cause analysis for information technology incident management using cognitive computing are disclosed. A method includes: generating, by a computing device, a cache including a plurality of links between causes and solutions; obtaining, by the computing device, information about a current incident; generating, by the computing device, search keys from the information about the current incident using natural language processing; searching, by the computing device, the cache using the search keys; iteratively generating, by the computing device, new search keys using results from a previous search and searching the cache using the new search keys; and displaying, by the computing device, solutions based on results from the searching and the iteratively generating and searching.

20 Claims, 5 Drawing Sheets

(56) References Cited

U.S. PATENT DOCUMENTS

| | | | | |
|---|---|---|---|---|
| 2009/0063387 A1* | 3/2009 | Beaty | ............... | G06N 5/04 |
| | | | | 706/50 |
| 2009/0313219 A1* | 12/2009 | Gupta | ............... | G06Q 10/10 |
| 2010/0162029 A1* | 6/2010 | Powell | ............... | G06Q 50/04 |
| | | | | 714/2 |
| 2010/0293176 A1* | 11/2010 | Burukhin | ......... | G06F 16/90348 |
| | | | | 707/759 |
| 2014/0129536 A1* | 5/2014 | Anand | ............... | G06N 7/005 |
| | | | | 707/706 |
| 2014/0351176 A1 | 11/2014 | Jan et al. | | |
| 2015/0088772 A1 | 3/2015 | Shwartz et al. | | |
| 2019/0325323 A1* | 10/2019 | Walthers | ............. | G06N 7/005 |
| 2019/0325771 A1* | 10/2019 | Ghatage | ............. | G09B 7/02 |

OTHER PUBLICATIONS

Bienfang, "Root-cause analysis with the 5 Whys technique—Practice—IBM Cloud Garage Method", IBM, https://www.ibm.com/cloud/garage/content/manage/practice_root_cause_analysis_using_5_whys, accessed Dec. 28, 2017; 5 pages.

* cited by examiner

PERFORMING ROOT CAUSE ANALYSIS FOR INFORMATION TECHNOLOGY INCIDENT MANAGEMENT USING COGNITIVE COMPUTING

BACKGROUND

The present invention generally relates to computing devices and, more particularly, to methods and systems for performing root cause analysis for information technology incident management using cognitive computing.

Monitored information technology (IT) environments with automation processes are used to reduce the risks of impacts caused by IT outages and improve speed, control, and agility in incident response. Monitoring systems usually respond to a symptom by opening a ticket for an incident. Each ticket that is opened must be addressed in a short period of time to avoid degradation or disruption of services.

Some incidents can be addressed with automated solutions, without requiring human intervention. Human intervention is required to address other incidents. If an incident is not automatically addressed, more time is typically required to solve the incident, because an analyst/specialist must be assigned and determine the problem. The analyst/specialist typically spends time researching previous incidents to determine the problem and identify a solution. Once the incident is solved, the ticket is closed and the root cause for the incident is described and stored in a database for future analysis or reference.

SUMMARY

In a first aspect of the invention, there is a method that includes: generating, by a computing device, a cache including a plurality of links between causes and solutions; obtaining, by the computing device, information about a current incident; generating, by the computing device, search keys from the information about the current incident using natural language processing; searching, by the computing device, the cache using the search keys; iteratively generating, by the computing device, new search keys using results from a previous search and searching the cache using the new search keys; and displaying, by the computing device, solutions based on results from the searching and the iteratively generating and searching.

In another aspect of the invention, there is a computer program product that includes a computer readable storage medium having program instructions embodied therewith. The program instructions are executable by a computing device to cause the computing device to: obtain information about a current incident; generate search keys from the information about the current incident using natural language processing; search a cache using the search keys; over four iterations, generate new search keys using results from a previous search and search the cache using the new search keys; and display solutions based on results from the searching and the iteratively generating and searching.

In another aspect of the invention, there is a system that includes: a hardware processor, a computer readable memory, and a computer readable storage medium associated with a computing device; program instructions configured to generate a cache including a plurality of links between causes and solutions; program instructions configured to obtain information about a current incident; program instructions configured to generate search keys from the information about the current incident using natural language processing; program instructions configured to search the cache using the search keys; program instructions configured to iteratively generate new search keys using results from a previous search and search the cache using the new search keys; and program instructions configured to display solutions based on results from the searching and the iteratively generating and searching, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
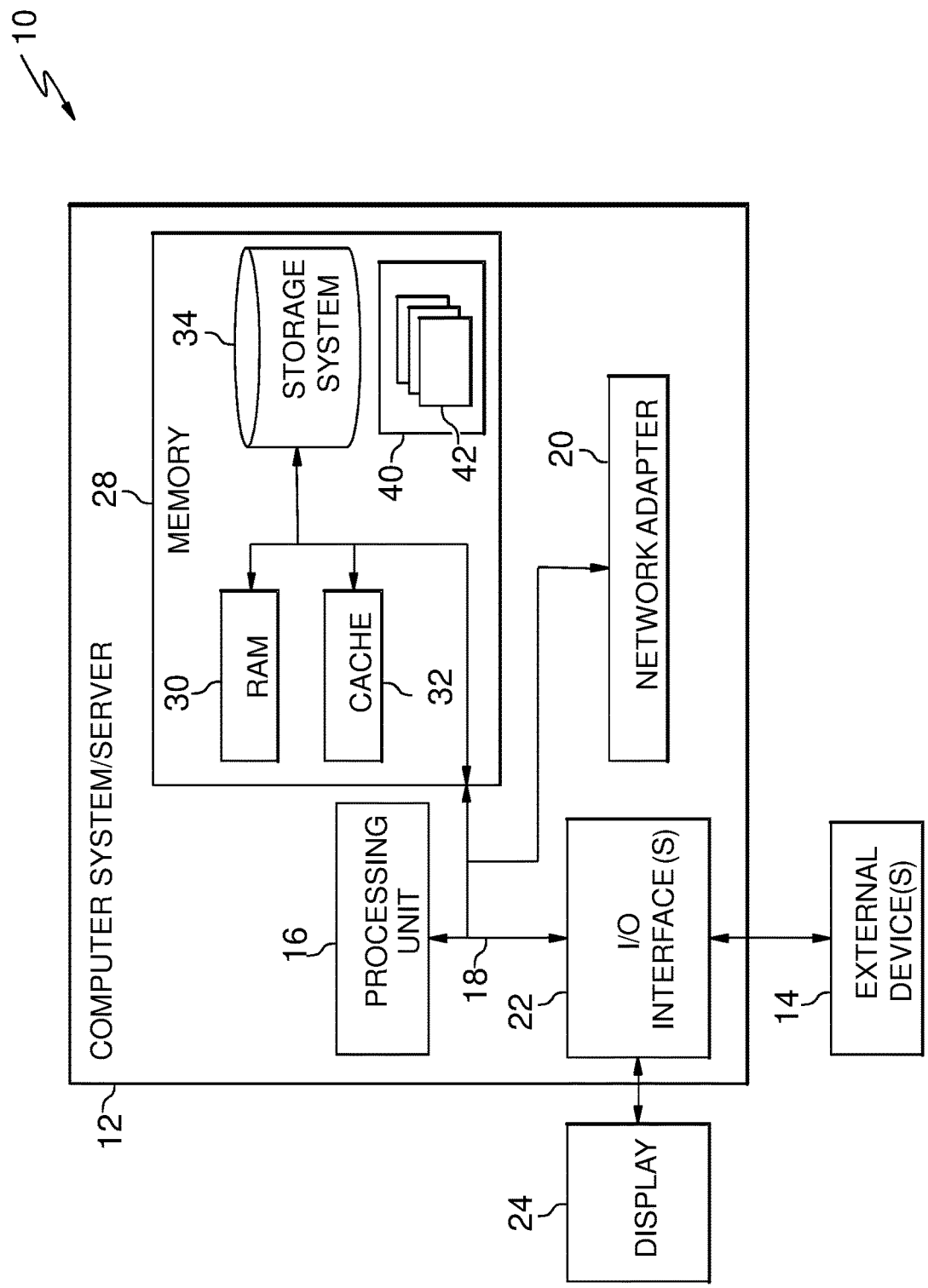
FIG. 1 depicts a computer system in accordance with aspects of the invention.

The present invention generally relates to computing devices and, more particularly, to methods and systems for performing root cause analysis for information technology incident management using cognitive computing. As described herein, aspects of the invention include a method and system that generate a cache of causes and solutions, receive information about a current incident, search the cache to determine a set of possible solutions, rank each of the solutions in the set, and display the ranked solutions.

In conventional practice, in response to an IT incident, analysts/specialists often spend time trying to answer questions such as, "How can I fix this to prevent the same issue from happening in the future?" or "How has this issue been fixed in the past?" Analysts/specialists typically search for solutions by asking peers for information or looking at reports describing previous incidents (e.g., issues that occurred a single time), problems (e.g., issues that occurred multiple times), and known issues (e.g., issues that are documented by a software provider or other party). This may consume valuable time, and the customer business may be impacted during this time before the incident is solved.

In embodiments, the 5-Whys root cause analysis technique is used to automatically determine causes and solutions for an incident, reducing the time required to resolve the incident. In particular, in response to an incident, natural language processing is used to search for causes and solutions in a cache that integrates information from incident databases, problem databases, knowledge management databases, and other trusted resources. Five levels of analysis are used to limit a search for solutions and avoid search loops.

In embodiments, a system and method are provided that autonomously perform the 5-Whys technique to perform root cause analysis of IT incidents. Cognitive technologies are used to analyze previous incidents and pre-index them in a cache. The cache is generated in a learning phase, during which multiple available databases are analyzed using natural language processing. In particular, natural language processing is used to analyze incident databases, problem databases, and knowledge management databases and generate a cache cause dataset and a cache solution dataset. These datasets function as a cache to speed up the search for causes and solutions.

In embodiments, after the initial learning phase, when an incident occurs, the system uses natural language processing to generate keys associated with the incident and searches the cache database to identify matching cause keys. The search results may include one or more cause keys, each having one or more associated solution keys representing possible solutions associated with the cause. This search is repeated four more times. In each subsequent search, each of the cause keys included in the results of the previous search is used to search the cache databases. Each subsequent search may return cause keys and associated solution keys that represent new solutions and/or the same solutions as were returned in one or more of the previous searches. The system stores and ranks each possible solution, based on a level of correlation with the cause being analyzed. The possible solutions with the highest ranks are then presented, via a user interface of an incident management tool, as the output of the system. Additionally, in embodiments, in order to improve the data that is stored in cache, the incident databases, problem databases, and knowledge management databases are periodically reanalyzed in order to identify new incidents and problems and add them to the cache databases.

Embodiments improve the functioning of a computer by providing methods and systems for performing root cause analysis for information technology incident management using cognitive computing. In particular, embodiments improve software by providing an improved mechanism for generating a cache of causes and solutions, receiving information about a current incident, searching the cache to determine a set of possible solutions, ranking each of the solutions in the set, and displaying the ranked solutions. These software improvements related to performing root cause analysis for information technology incident management using cognitive computing provide for automatically determining causes and solutions for an incident, reducing the time required to resolve the incident. Embodiments generate new data in the form of a cache and utilize this new data in performing the steps of the embodiments. Additionally, implementations of the invention use techniques that are, by definition, rooted in computer technology (e.g., cognitive computing and natural language processing). For example, natural language processing includes using computers to process, understand, and interpret human languages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
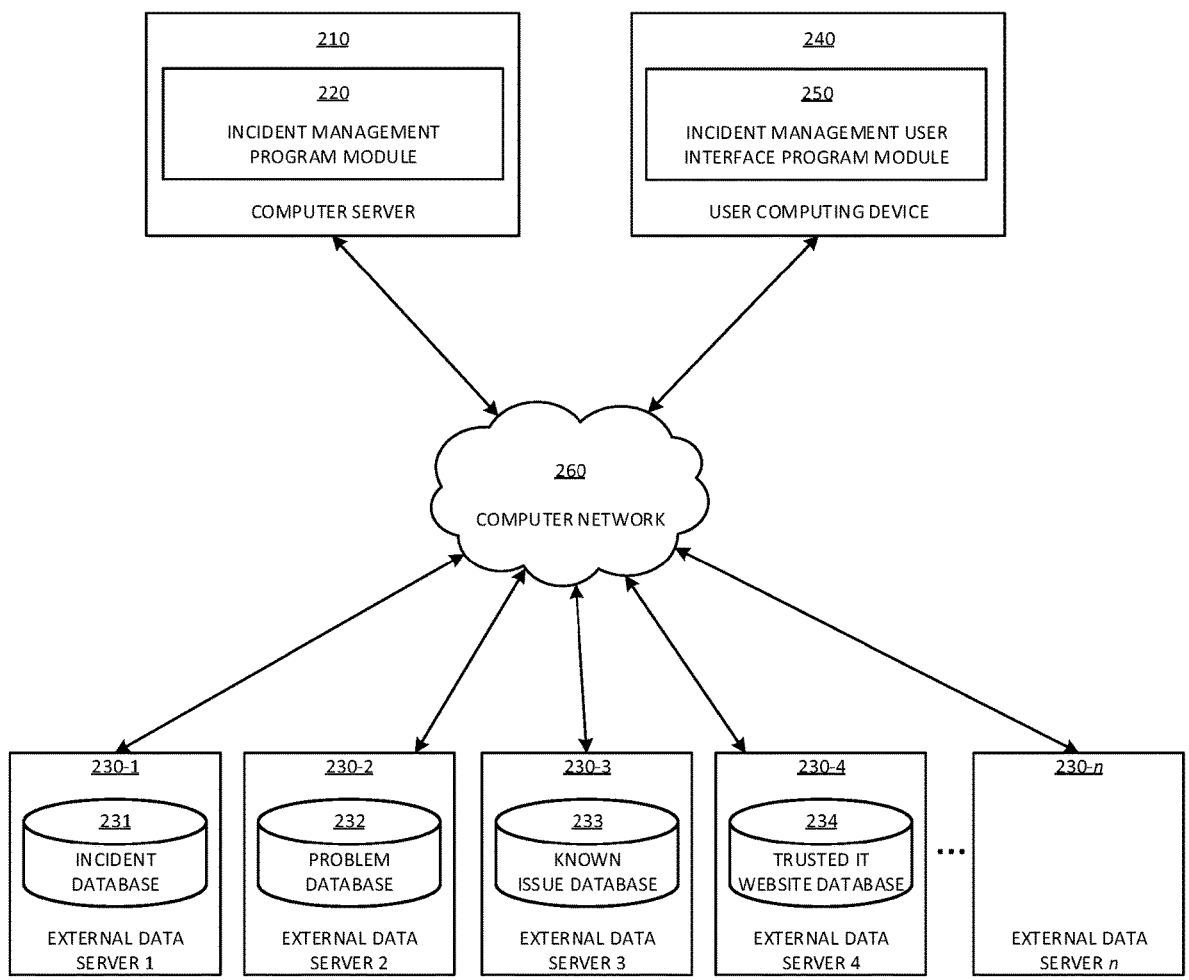
FIG. 2 depicts an illustrative environment in accordance with aspects of the invention.

FIG. 2 depicts an illustrative environment 200 in accordance with aspects of the invention. As shown, the environment 200 comprises a computer server 210, external data servers 230-1, 230-2, 230-3, 230-4, . . . , 230-n, and a user computing device 240 which are in communication via a computer network 260. In embodiments, the computer network 260 is any suitable network including any combination of a LAN, WAN, or the Internet. In embodiments, the computer server 210, the external data servers 230-1, 230-2, 230-3, 230-4, . . . , 230-n, and the user computing device 240 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes an incident management program module 220, which includes hardware and/or software and is one or more of the program modules 42 shown in FIG. 1. According to an embodiment, the incident management program module 220 includes program instructions for performing root cause analysis for information technology incident management using cognitive computing. In embodiments, the program instructions included in the incident management program module 220 of the computer server 210 are executed by one or more hardware processors. In embodiments, the computer server 210 also stores a cache database 225.

Still referring to FIG. 2, in embodiments, the external data servers 230-1, 230-2, 230-3, 230-4, . . . , 230-n are computer devices comprising one or more elements of the computer system/server 12 (as shown in FIG. 1). In particular, the external data servers 230-1, 230-2, 230-3, 230-4, . . . , 230-n are implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In embodiments, the external data server 1 230-1 stores an incident database 231, the external data server 2 230-2 stores a problem database 232, the external data server 3 230-3 stores a known issue database 233, and the external data server 4 230-4 stores a trusted IT website database 234.

In embodiments, the incident database 231 stores information about IT incidents, including, for each incident, a description of a cause of the incident, a description of a solution used to resolve the incident, and services, devices, and/or applications associated with the incident. In embodiments, the problem database 232 stores information about IT problems obtained from root cause analysis for each of the problems, including, for each problem, a description of a cause of the problem, a number of occurrences of the problem, a description of one or more solutions used to resolve the problem, and services, devices, and/or applications associated with the problem. In embodiments, the known issue database 233 stores information about IT known issues (e.g., provided by a hardware/software company), including, for each known issue, a description of a cause of the known issue, a description of one or more solutions used to resolve the known issue, and services, devices, and/or applications associated with the known issue. In embodiments, the trusted IT website database 234 is associated with a trusted IT website and provides information about IT problems including, for each problem, a description of a cause of the problem, a description of one or more solutions used to resolve the problem, and services, devices, and/or applications associated with the problem.

Still referring to FIG. 2, in embodiments, the user computing device 240 is a computer device comprising one or more elements of the computer system/server 12 (as shown in FIG. 1) and is a desktop computer, a laptop computer, a mobile device such as a cellular phone, tablet, personal digital assistant (PDA), or other computing device. In other embodiments, the user computing device 240 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the user computing device 240 includes an incident management user interface program module 250, which includes hardware and/or software and is one or more of the program modules 42 shown in FIG. 1. According to an embodiment, the incident management user interface program module 250 includes program instructions for displaying one or more possible solutions for an IT incident that are received from the incident management program module 220 of the computer server 210. In embodiments, the program instructions included in the incident management user interface program module 250 of the user computing device 240 are executed by one or more hardware processors.

Figure 3:
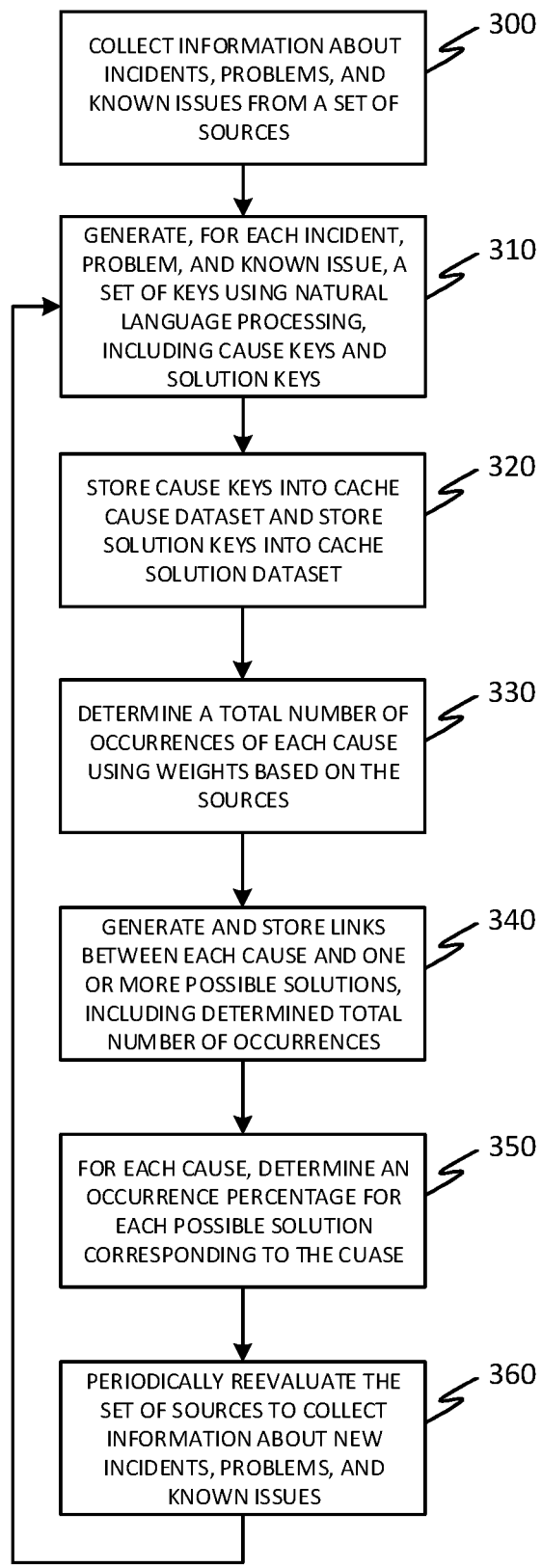
FIG. 3 depicts a flowchart of an exemplary method performed as a caching or pre-indexing process in accordance with aspects of the invention.

FIG. 3 depicts a flowchart of an exemplary method performed by the incident management program module 220 of the computer server 210 as a caching or pre-indexing process in accordance with aspects of the invention. The steps of the method are performed in the environment of FIG. 2 and are described with reference to the elements shown in FIG. 2.

At step 300, the computer server 210 collects information about incidents, problems, and known issues from a set of sources. In embodiments, the incident management program module 220 requests and receives information about incidents from the external data server 1 230-1 (of FIG. 2), requests and receives information about problems from the external data server 2 230-2 and the external data server 4 230-4 (of FIG. 2), and requests and receives information about known issues from the external data server 3 230-3 (of FIG. 2).

In particular, the incident management program module 220 receives from the incident database 231 of the external data server 1 230-1, for each incident stored therein, a description of a cause of the incident, a description of a solution used to resolve the incident, and services, devices, and/or applications associated with the incident. The incident management program module 220 receives from the problem database 232 of the external data server 2 230-2, for each problem stored therein, a description of a cause of the problem, a number of occurrences of the problem, a description of one or more solutions used to resolve the problem, and services, devices, and/or applications associated with the problem. The incident management program module 220 receives from the known issue database 233 of the external data server 3 230-3, for each known issue stored therein, a description of a cause of the known issue, a description of one or more solutions used to resolve the known issue, and services, devices, and/or applications associated with the known issue. The incident management program module 220 receives from the trusted IT website database 234 of the external data server 4 230-4, for each problem stored therein, a description of a cause of the problem, a description of one or more solutions used to resolve the problem, and services, devices, and/or applications associated with the problem.

At step 310, the computer server 210 generates, for each incident, problem, and known issue, a set of keys using natural language processing, including cause keys and solution keys. In embodiments, the incident management program module 220 uses natural language processing to interpret the information collected at step 300 and step 360 (described herein). In particular, for each incident, problem, and known issue collected at step 300, or for each new incident, new problem, and new known issue collected at step 360, the incident management program module 220 applies natural language processing to the description of the cause to generate one or more cause keys that describe the cause of the incident, problem, or known issue. Additionally, for each incident, problem, and known issue collected at step 300, or for each new incident, new problem, and new known issue collected at step 360, the incident management program module 220 applies natural language processing to the description of the resolution to generate one or more solution keys that describe the solution to the incident, problem, or known issue.

In an example, for a problem of "XYZ application stopped," the incident management program module 220 generates, from a description of the cause of the problem, a "file system full" cause key. Additionally, the incident management program module 220 generates, from the resolution description, solution keys describing various solutions, including Solution1, Solution2, and Solution3.

At step 320, the computer server 210 stores the cause keys into a cache cause dataset and stores the solution keys into a cache solution dataset. In embodiments, the incident management program module 220 stores the cache cause keys generated at step 310 as the cache cause dataset (e.g., a cache cause table) in the cache database 225 on the computer server 210 and stores the cache solutions keys generated at step 310 as the cache solution dataset (e.g., a cache solution table) in the cache database 225 on the computer server 210.

At step 330, the computer server 210 determines a total number of occurrences of each cause in the information received at step 300, using weights based on the sources. In embodiments, the incident management program module 220 analyzes the information collected at step 300 to determine a number of occurrences for each cause, corresponding to one or more cause keys generated at step 310, across each of the incident database 231, the problem database 232, the known issue database 233, and the trusted IT website database 234.

In an example, a first cause Cause1 corresponds to a set of cause keys Key1, Key2, Key3; a second cause Cause2 corresponds to a set of cause keys Key2, Key3; and a third cause Cause3 corresponds to a set of cause keys Key2, Key4. The incident management program module 220 analyzes the information collected at step 300 and determines that Cause1 occurs 10 times in the incident database 231, 5 times in the problem database 232, 5 times in the known issue database 233, and 7 times in the trusted IT website database 234. Additionally, the incident management program module 220 analyzes the information collected at step 300 and determines that Cause2 occurs 6 times in the incident database 231, 4 times in the problem database 232, 1 time in the known issue database 233, and 2 times in the trusted IT website database 234. Finally, the incident management program module 220 analyzes the information collected at step 300 and determines that Cause3 occurs 2 times in the incident database 231, 1 time in the problem database 232, 0 times in the known issue database 233, and 0 times in the trusted IT website database 234.

After determining the number of occurrences for each cause in the information received at step 300 across each of the sources, the incident management program module 220 applies weights to determine the total number of occurrences for each cause. In embodiments, the incident management program module 220 assigns a highest weight to causes occurring in the known issue database 233, assigns an intermediate weight to causes occurring in the problem database 232, and assigns a lowest weight to causes occurring in the incident database 231 and the trusted IT website database 234. The number occurrences of the cause in each source is multiplied by the weight associated with the source, and the numbers are summed to determine the total number of occurrences for the cause.

Continuing the above example, the incident management program module 220 assigns a weight of 4 to causes occurring in the known issue database 233, assigns a weight of 2 to causes occurring in the problem database 232, and assigns a weight of 1 to causes occurring in the incident database 231 and the trusted IT website database 234. Accordingly, the incident management program module 220 determines a total number of occurrences for Cause1 to be 1*(10+7)+2*5+4*5=47. Additionally, the incident management program module 220 determines a total number of occurrences for Cause2 to be 1*(6+2)+2*4+4*1=20. Finally, the incident management program module 220 determines a total number of occurrences for Cause3 to be 1*(2+0)+2*1+4*0=4.

At step 340, the computer server 210 generates and stores links between each cause and one or more possible solutions, including the determined total number of occurrences. In embodiments, the incident management program module 220, for each cause in the information received at step 300, generates and stores, in the cache database 225, information about a link between the cause and one or more possible solutions. In particular, for each cause, the incident management program module 220 stores in the cache database 225, as the information about the link, information identifying each of the cause keys (generated at step 310) corresponding to the cause, information identifying one or more possible solutions (each possible solution corresponding to a set of one or more solution keys generated at step 310), information about the number of occurrences (in association with the cause) of each of the one or more possible solutions in the information received at step 300, and the determined total number of occurrences of the cause (generated at step 330).

At step 350, the computer server 210, for each cause, determines an occurrence percentage for each of the one or more possible solutions corresponding to the cause. In embodiments, the incident management program module 220 uses the information about the number of occurrences (in association with the cause) of each of the one or more possible solutions from the links generated and stored at step 340 to determine a percentage of the time each of the possible solutions is the solution for the cause. The incident management program module 220 stores the determined occurrence percentages with the link between the cause and the one or more possible solutions in the cache database 225.

In an example, Solution1 is a possible solution that corresponds to the set of solution keys Key1, Key2, Key3 and is determined to be the solution to Cause1 in 60% of the occurrences of Cause1. Solution2 is a possible solution that corresponds to the set of solution keys Key2, Key3 and is determined to be the solution to Cause1 in 30% of the occurrences of Cause1. Solution3 is a possible solution that corresponds to the set of solution keys Key2, Key4 and is determined to be the solution to Cause1 in 5% of the occurrences of Cause1. Other solutions are determined to be the solutions for the other 5% of the occurrences of Cause1.

At step 360, the computer server 210 periodically reevaluates the set of sources to collect information about new incidents, problems, and known issues. In embodiments, at predetermined intervals, the incident management program module 220 requests and receives information about new and updated incidents from the external data server 1 230-1 (of FIG. 2), requests and receives information about new and updated problems from the external data server 2 230-2 and the external data server 4 230-4 (of FIG. 2), and requests and receives information about new and updated known issues from the external data server 3 230-3 (of FIG. 2).

In particular, the incident management program module 220 receives from the incident database 231 of the external data server 1 230-1, for each new and updated incident stored therein, a description of a cause of the incident, a description of a solution used to resolve the incident, and services, devices, and/or applications associated with the incident. The incident management program module 220 receives from the problem database 232 of the external data server 2 230-2, for each new and updated problem stored therein, a description of a cause of the problem, a number of occurrences of the problem, a description of one or more solutions used to resolve the problem, and services, devices, and/or applications associated with the problem. The incident management program module 220 receives from the known issue database 233 of the external data server 3 230-3, for each new and updated known issue stored therein, a description of a cause of the known issue, a description of one or more solutions used to resolve the known issue, and services, devices, and/or applications associated with the known issue. The incident management program module 220 receives from the trusted IT website database 234 of the external data server 4 230-4, for each new and updated problem stored therein, a description of a cause of the problem, a description of one or more solutions used to resolve the problem, and services, devices, and/or applications associated with the problem. The flow then returns to step 310.

Figure 4:
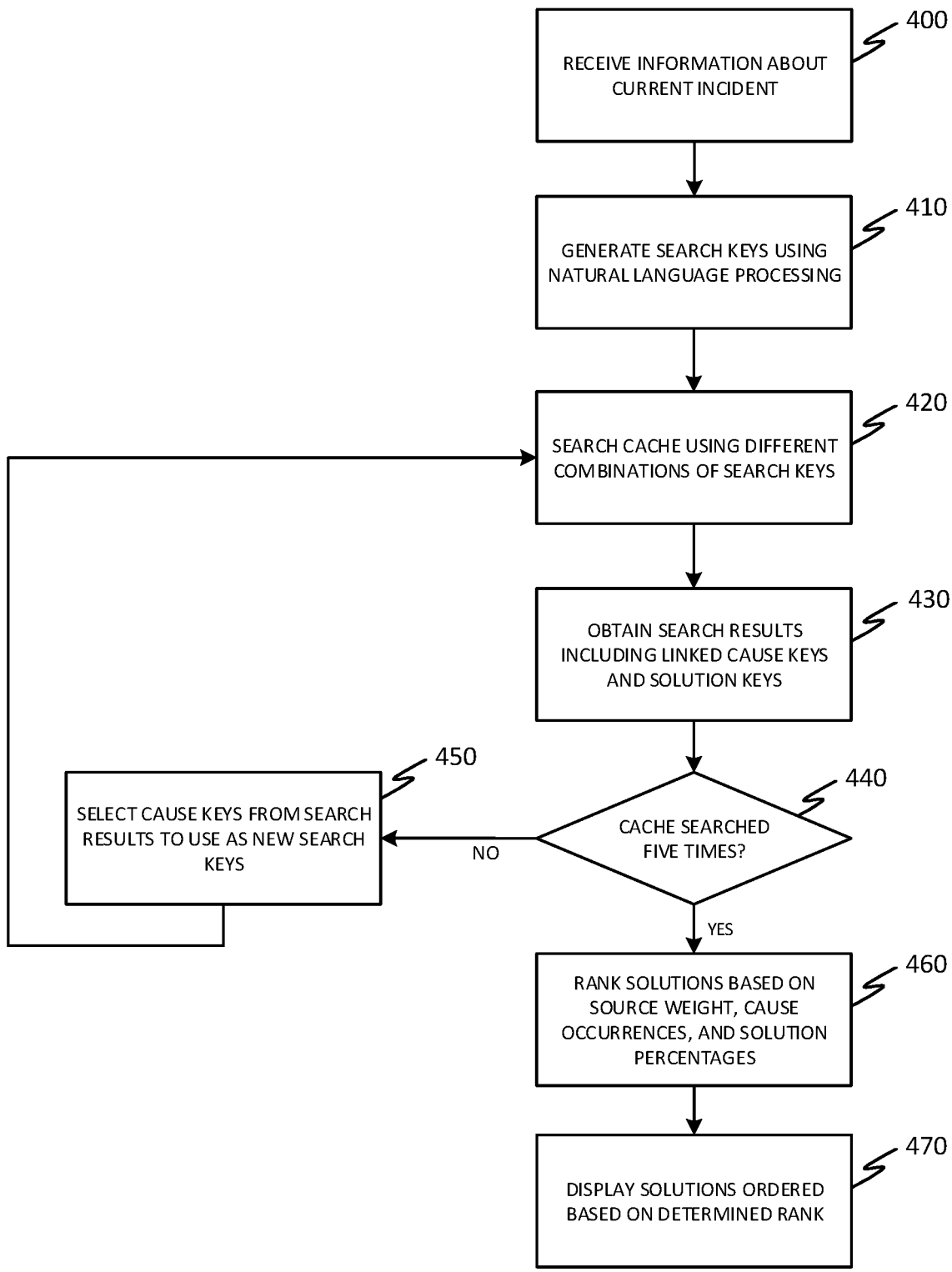
FIG. 4 depicts a flowchart of an exemplary method performed as an autonomous solution identification process in accordance with aspects of the invention.

FIG. 4 depicts a flowchart of an exemplary method performed by the incident management program module 220 of the computer server 210 as an autonomous solution identification process in accordance with aspects of the invention. The steps of the method are performed in the environment of FIG. 2 and are described with reference to the elements shown in FIG. 2.

At step 400, the computer server 210 receives information about a current incident. In embodiments, the incident management program module 220 requests and receives information about the current incident from the user interface program module 250 of the user computing device 240 (of FIG. 2). In particular, the incident management program module 220 receives, from the user interface program module 250, information including a description of the current incident and services, devices, and/or applications associated with the current incident.

At step 410, the computer server 210 generates search keys using natural language processing. In embodiments, the incident management program module 220 uses natural language processing to interpret the information collected at step 400. In particular, the incident management program module 220 applies natural language processing to the description of the current incident and services, devices, and/or applications associated with the current incident received at step 400 to generate a plurality of search keys. In an example, the incident management program module 220 generates search keys SearchKey1, SearchKey2, and SearchKey3 from the description of the current incident and services, devices, and/or applications associated with the current incident.

At step 420, the computer server 210 searches the cache using different combinations of search keys. In embodiments, the incident management program module 220 uses different combinations of the search keys generated at step 410 or the new search keys selected at step 450 to search the cache database 225 to identify links having cause keys corresponding to the search keys. In an example, the incident management program module 220 searches the cache database 225 using a first combination of SearchKey1, SearchKey2, SearchKey3; a second combination of SearchKey1, SearchKey2; a third combination of SearchKey1, SearchKey3; and a fourth combination of SearchKey2, SearchKey3 to identify links having combinations of cause keys matching the search keys.

At step 430, the computer server 210 obtains the search results including linked cause keys and solution keys. In embodiments, the incident management program module 220 identifies, as the search results from the search at step 420, one or more links stored in the cache database 225. Each link identified as a search result by the incident management program module 220 includes cause keys corresponding to the search keys used to search the cache database 225 at step 420, and potentially also includes additional cause keys.

At step 440, the computer server 210 determines whether the cache has been searched five times. In embodiments, the incident management program module 220 determines whether or not the search at step 420 has been performed five times. If the incident management program module 220 determines that the search at step 420 has not been performed five times, then the flow proceeds to step 450. On the other hand, if the incident management program module 220 determines that the search at step 420 has been performed five times, then the flow proceeds to step 460. In other embodiments, a different number or threshold may be used instead of five.

At step 450, the computer server 210 selects cause keys from the search results to use as new search keys. In embodiments, the incident management program module 220 selects the cause keys included in the links stored in the cache database 225 from the search results obtained at step 430 to be used as the new search keys. The cause keys selected by the incident management program module 220 may include cause keys that were previously used as search keys as well as cause keys that were not previously used as search keys.

At step 460, the computer server 210 ranks solutions based on source weight, cause occurrences, and solution occurrence percentages. In embodiments, the incident management program module 220 ranks each of the solutions included in the search results obtained at step 430 in each of the five searches. In particular, for each solution, a rank is obtained by multiplying the weight for the source associated with the cause and solution by the number of occurrences of the cause and by the occurrence percentage associated with the solution.

At step 470, the computer server 210 displays the solutions ordered based upon determined rank. In embodiments, the incident management program module 220 causes the solutions to be displayed by the user interface program module 250 of the user computing device 240. In particular, the user interface program module 250 displays each of the solutions in order from highest ranked to lowest ranked, based on the ranking determined at step 460. In other embodiments, the user interface program module 250 only displays solutions above a predetermined rank or only displays a predetermined number of the highest-ranking solutions.

Figure 5:
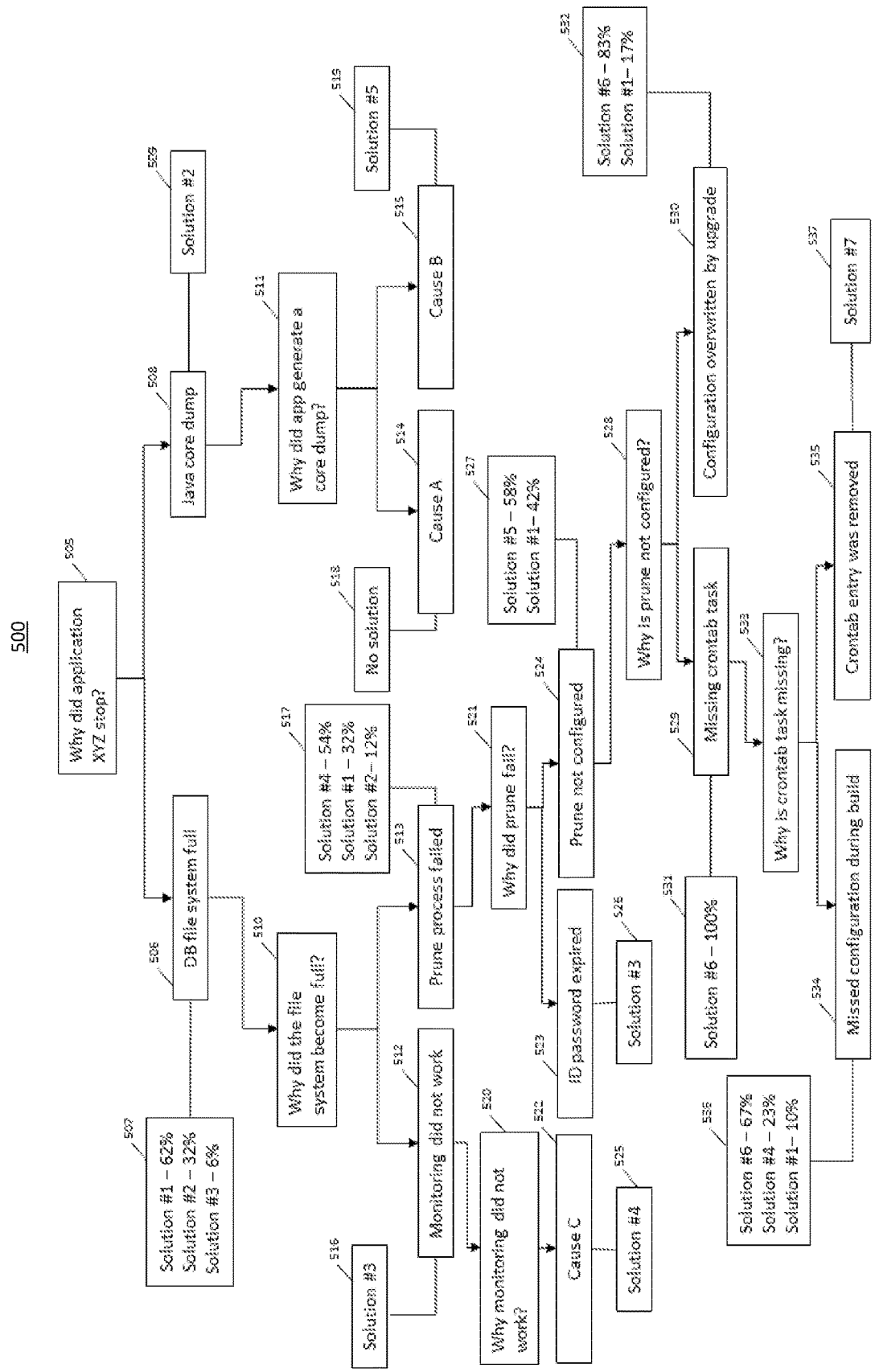
FIG. 5 depicts an illustrative example of a search in accordance with aspects of the invention.

FIG. 5 depicts an illustrative example 500 of the search performed by the incident management program module 220 in accordance with aspects of the invention. In the example 500, a first search is performed using search key 505. The first search results include cause 506 and linked solutions 507 as well as cause 508 and linked solution 509. A second search is performed using search keys 510 and 511. The second search results include causes 512, 513, 514, and 515 and linked solutions 516, 517, 518, and 519. A third search is performed using search keys 520 and 521. The third search results include causes 522, 523, and 524 and linked solutions 525, 526, and 527. A fourth search is performed using search key 528. The fourth search results include causes 529 and 530 and linked solutions 531 and 532. Finally, a fifth search is performed using search key 533. The fifth search results include causes 534 and 535 and linked solutions 536 and 537.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by a computing device, information about information technology incidents and problems;
    generating, by the computing device, cause keys and solution keys by analyzing the information about information technology incidents and problems using natural language processing;
    generating, by the computing device, a cache including a plurality of links between causes and possible solutions, wherein each respective one of the plurality of links defines a respective set of the cause keys;
    obtaining, by the computing device, information about a current incident;
    generating, by the computing device, plural search keys from the information about the current incident using natural language processing;
    searching, by the computing device, the cache using the plural search keys, wherein the searching comprises comparing different combinations of the plural search keys to the respective sets of the cause keys;
    iteratively generating, by the computing device, new search keys using results from a previous search and searching the cache using the new search keys; and
    displaying, by the computing device, ranked solutions based on results from the searching and the iteratively generating and searching.

2. The method according to claim 1, wherein each respective one of the plurality of links further includes: information defining the possible solutions corresponding to a respective set of the solution keys; information defining a number of occurrences of each of the possible solutions; and a determined total number of occurrences of the cause.

3. The method according to claim 1, further comprising: storing, by the computing device, the cause keys and the solutions keys in the cache.

4. The method according to claim 1, wherein the information about the current incident comprises a description of the current incident and services, devices, and/or applications associated with the current incident.

5. The method according to claim 1, wherein the iteratively generating and searching comprises four iterations.

6. The method according to claim 1, further comprising determining, by the computing device, a rank for each of the ranked solutions based on the results from the searching and the iteratively generating and searching.

7. The method according to claim 6, wherein the displaying the ranked solutions is based on the rank for each of the ranked solutions.

8. A computer program product comprising a computer readable storage medium having program instructions embodied therewith, the program instructions executable by a computing device to cause the computing device to:
   obtain information about a current incident;
   generate plural search keys from the information about the current incident using natural language processing;
   search a cache using different combinations of the plural search keys;
   over four iterations, generate new search keys using results from a previous search and search the cache using the new search keys; and
   display solutions based on results from the searching and the iteratively generating and searching.

9. The computer program product according to claim 8, the program instructions further being executable by the computing device to cause the computing device to generate a cache including a plurality of links between causes and possible solutions.

10. The computer program product according to claim 9, the program instructions further being executable by the computing device to cause the computing device to obtain information about information technology incidents and problems, wherein the plurality of links between causes and possible solutions are generated using the information about information technology incidents and problems.

11. The computer program product according to claim 10, the program instructions further being executable by the computing device to cause the computing device to:
   generate, using natural language processing, cause keys and solution keys using the information about information technology incidents and problems; and
   store the cause keys and the solutions keys in the cache, wherein the searching comprises comparing the different combinations of the plural search keys to respective sets of the cause keys.

12. The computer program product according to claim 8, wherein the information about the current incident comprises a description of the current incident and services, devices, and/or applications associated with the current incident.

13. The computer program product according to claim 8, the program instructions further being executable by the computing device to cause the computing device to determine a rank for each of the solutions based on the results from the searching and the iteratively generating and searching.

14. The computer program product according to claim 8, wherein the displaying the solutions is based on the rank for each of the solutions.

15. A system comprising:
   a hardware processor, a computer readable memory, and a computer readable storage medium associated with a computing device;
   program instructions configured to generate a cache including a plurality of links between causes and solutions;
   program instructions configured to obtain information about a current incident;
   program instructions configured to generate search keys from the information about the current incident using natural language processing;
   program instructions configured to search the cache using the search keys;
   program instructions configured to iteratively generate new search keys using results from a previous search and search the cache using the new search keys; and
   program instructions configured to display solutions based on results from the searching and the iteratively generating and searching,
   wherein the program instructions are stored on the computer readable storage medium for execution by the hardware processor via the computer readable memory.

16. The system according to claim 15, further comprising:
   program instructions configured to obtain information about information technology incidents and problems, and
   wherein the plurality of links between causes and solutions are generated using the information about information technology incidents and problems.

17. The system according to claim 16, further comprising:
   program instructions configured to generate, using natural language processing, cause keys and solution keys using the information about information technology incidents and problems; and
   program instructions configured to store the cause keys and the solutions keys in the cache.

18. The system according to claim 15, wherein the information about the current incident comprises a description of the current incident and services, devices, and/or applications associated with the current incident, and wherein the cache is generated prior to the obtaining the information about the current incident.

19. The system according to claim 15, wherein the iteratively generating and searching comprises four iterations.

20. The system according to claim 15, further comprising program instructions configured to determine a rank for each of the solutions based on the results from the searching and the iteratively generating and searching, and
   wherein the displaying the solutions is based on the rank for each of the solutions.

* * * * *